United States Patent
Bremond

[15] 3,637,088
[45] Jan. 25, 1972

[54] COUPLING SYSTEM FOR VEHICLES IN PARTICULAR RAILWAY VEHICLES

[72] Inventor: Genevieve Bremond, Paris, France
[73] Assignee: Paulstra, Levallois-Perret, France
[22] Filed: Apr. 8, 1969
[21] Appl. No.: 814,275

[30] Foreign Application Priority Data

Apr. 11, 1968 France.....................147838

[52] U.S. Cl.................213/45, 213/40 R, 213/46
[51] Int. Cl................................................B61g 9/06
[58] Field of Search..............213/22, 30, 40, 44, 45, 46, 213/47

[56] References Cited

UNITED STATES PATENTS

| | | | |
|---|---|---|---|
| 2,001,855 | 5/1935 | Spencer | 213/40 D |
| 2,553,635 | 5/1951 | Dath | 213/45 |
| 2,738,078 | 3/1956 | Tucker | 213/45 |
| 2,934,216 | 4/1960 | Campbell | 213/45 |
| 3,047,163 | 7/1962 | Johnson et al. | 213/40 |
| 3,185,317 | 5/1965 | Willison | 213/45 |

Primary Examiner—Drayton E. Hoffman
Attorney—Larson, Taylor & Hinds

[57] ABSTRACT

The coupling comprises two groups of rubber slabs which transmit the traction force and the buffering force to the chassis of the vehicle, both these forces compressing the slabs during their transmission. The slabs are generally rectangular and have their corners cut off to form cants. The slots are disposed parallel to the small sides of the rectangle. The two groups of slabs are precompressed by rods passing by the slabs adjacent to their cants.

6 Claims, 8 Drawing Figures

COUPLING SYSTEM FOR VEHICLES IN PARTICULAR RAILWAY VEHICLES

This invention relates to systems for coupling together vehicles, in particular automatic coupling systems, more especially for railway vehicles. Systems of the type in question comprise, inside an appropriate casing or support fixed to the chassis of the vehicle, elastic shock absorber devices arranged in the form of a plurality of juxtaposed slabs or elastomeric material such as rubber.

The chief object of this invention is to provide systems of this type which fulfill better the requirements of practice, and which are in particular of simple manufacture, of small size, and of easy assembly.

In accordance with the principal feature of this invention, in order to increase the elasticity of the rubber slabs, they are provided with slots, notably parallel, and, in particular, in the case in which these slabs have a general rectangular shape, these slots are disposed parallel to the smaller sides of the rectangle.

Apart from this principal feature, the invention includes various other features which are preferably used at the same time, in particular:

a second feature, according to which, means (such as rods and nuts) are provided, on the devices, for ensuring precompression of the elastic slabs, and also, possibly, for facilitating the assembly of the juxtaposed slabs into blocks in the space which is reserved for them, and a third feature relating in particular to the systems of the type in question which comprise at least two blocks of juxtaposed slabs, notably rectangular, these blocks being positioned in the casing one after the other according to which two pairs of guide rods coact with these two blocks, these two pairs of rods being disposed respectively in different planes, in particular in planes diagonal, with respect to the rectangular slabs, the slabs advantageously comprising cut off corners forming cants, in order to decrease the bulk.

The invention will be, in any case, well understood with the aid of the following description, as well as of the accompanying drawings, which description and drawings are given merely by way of example.

The following description relates to one embodiment of an elastic device according to the invention, having slabs of elastomer such as rubber, to be incorporated in a coupling system for railway vehicles.

Figure 1:
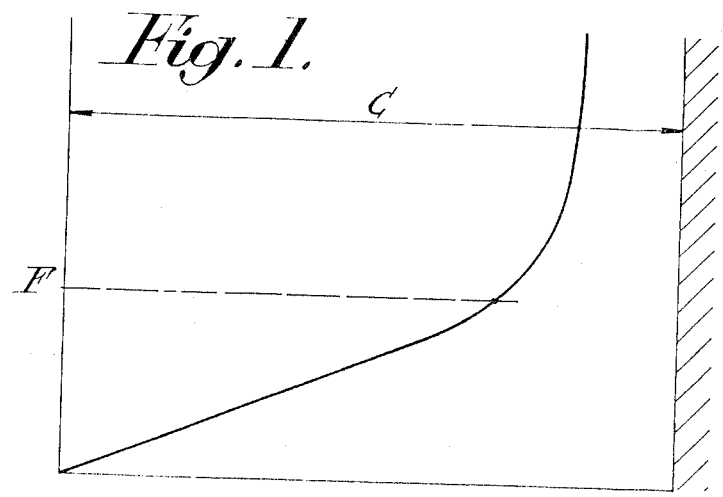
FIG. 1 is a diagram illustrating the variation of force (ordinates), as a function of the stroke (abscissae), of systems according to the invention.

First of all it will be recalled that such devices are known, and that their purpose is to obtain a diagram of elasticity such as the diagram represented in FIG. 1, characterized by a linear part (that is to say where the force F develops approximately proportionally to the stroke C), followed by a rising part, of hyperbolic shape, that is to say tending to remain asymptotic at the maximum value of the stroke.

Now, it is known to use for this purpose piles of elastic slabs or cushions, which slabs fit together with the interposition of intercalary sheet metal plates, the respective faces of these elements comprising ribs and grooves for ensuring centering when they fit together.

It is advantageous to provide two different curves of elasticity, respectively for the direction of thrust or buffing and for the direction of traction or draft. To do this, the piled elements are divided into two groups, such that the two groups are compressed in series under the action of buffing, but that only a single group comes into play in the case of traction.

Having made review of this the prior art, the features of the present invention will be described, which features cooperate to improve the performance of the coupling device, without introducing excessive bulk. These features are applied in the assembly shown in FIGS. 2 and 3. In this ensemble, the fixed bearing surfaces 1 and 2 of a casing of a coupling system can be seen, this casing being intended to be fixed to the chassis of the vehicle, and in particular to the under side of the chassis; this system comprises for example two members such as a piston or bar 3 intended to receive the buffing forces (reaction $f_1$) from the neighboring vehicles and a shackle or stirrup member intended to receive the forces of traction $f_2$. These two members 3 and 4 are guided with respect to one another, by means of a shaft 5 carried by one of these two members and passing through the other member via one or more guiding slots 6, although other arrangements could be adopted. The coupling hook proper has not been shown, nor the members cooperating with the hook to effect the automatic coupling. These buffer and draft members are adapted to transmit their forces to the piles of elastic slabs which will now be described.

According to one of the features of this invention, the rubber slabs 7 (which are given a rectangular shape) are provided with slots 8, preferably parallel to the small side of the rectangle, the width of these slots being such that their sides come into contact when the force F corresponding to the end of the linear portion of the curve (FIG. 1) is reached, so that for greater forces a substantial stiffening is obtained; the number of these slots and their length are predetermined obtain the desired curve. These slots lead, at each of their ends, into circular holes 9 of diameter substantially greater than the width of the slots (at least one and a half times the width of the slots), to produce the above-mentioned force/stroke and at the same time to avoid, under the effect of the compression, and hence of the narrowing of the slots which results from this compression, local stresses being produced at the ends of the slots, which stresses would be dangerous for the material and detrimental to its longevity.

Figure 5:
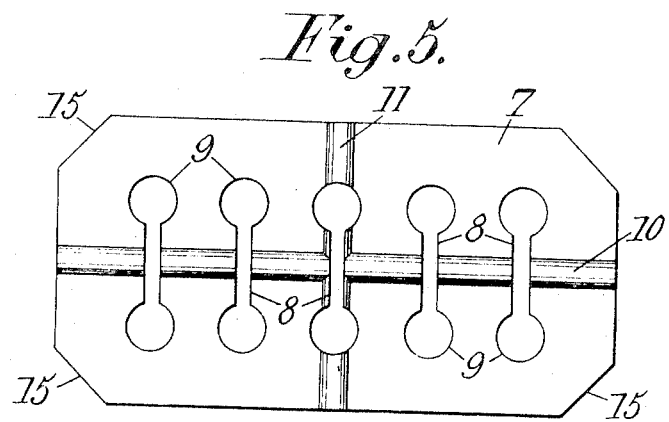
FIGS. 5 and 6 show respectively in plan and in side view, one of the slabs of rubber of this device.
Figure 6:
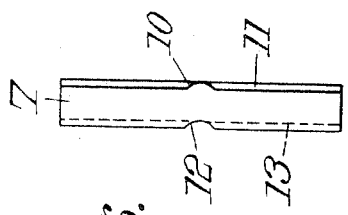

As can be seen in FIGS. 5 and 6, the slabs each comprise a pair of ribs 10 and 11 and a pair of grooves 12 and 13, the ribs and grooves being in the form of a cross.

Figure 7:
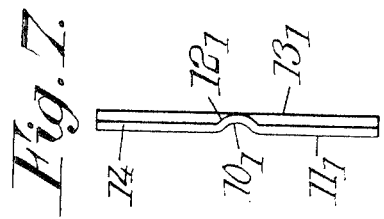
FIG. 7 shows in side view one of the intercalary metallic support plates of this device.

FIG. 7 shows the corresponding grooves $10_1$, $11_1$ and ribs $12_1$, $13_1$ of the metal plate 14, which fit into the corresponding ribs 10, 11 and grooves 12, 13 of the rubber slabs situated on opposite sides of the metal plate.

The rubber slabs 7 and the metal plates 14 have their four corners cut off so as to form cants 15 in order to leave room for the passage of rods whose role will be specified later on, without having to increase the transverse size of the device.

Another feature of the invention will now be described, relating to the assembly of the slabs inside the space bounded, in the casing mentioned above, by the surfaces 1 and 2, so that these slabs can cooperate with the piston 3 and the shackle 4.

The assembly of slabs is divided, according to the principle recalled above, into two groups or blocks 16, 17 (FIG. 2) bearing at their ends against three rigid metal plates, namely two end plates 18, 19 (FIGS 2 and 8) and an intermediate plate 20 situated between the two blocks 16, 17.

Figure 4:
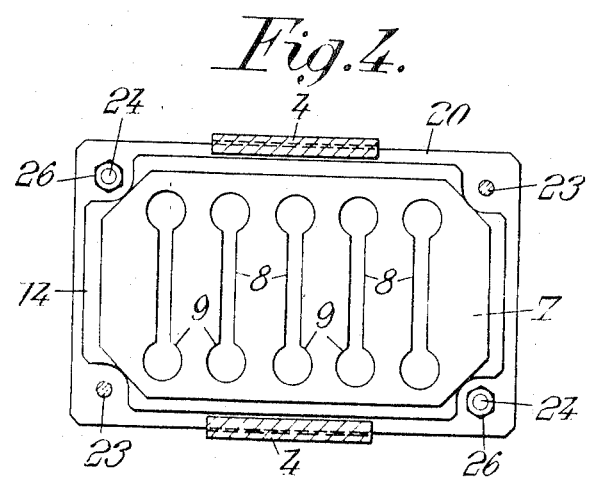
FIGS. 2 to 4 show schematically and respectively in elevation, in plan and in section along IV—IV of FIG. 2, one embodiment of an elastic shock absorber device, for a railway vehicle coupling system, constructed according to the invention.
Figure 2:
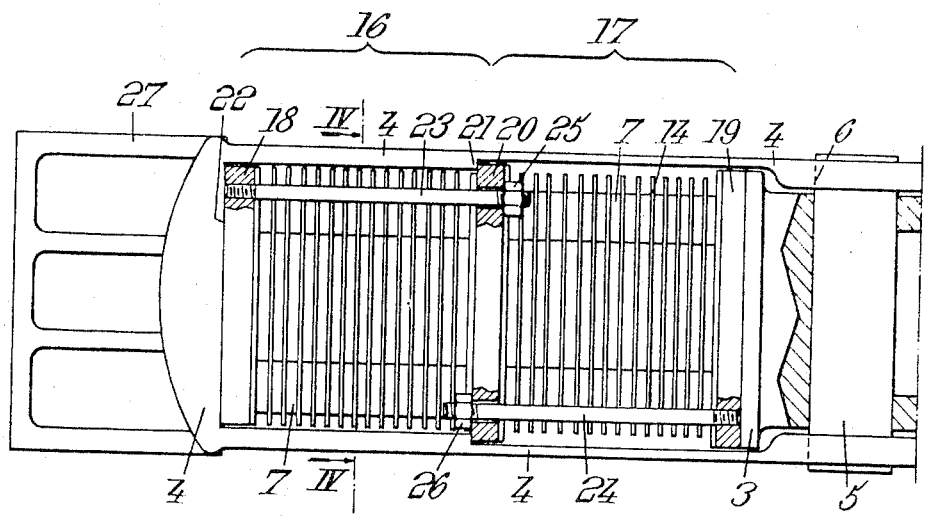
Figure 3:
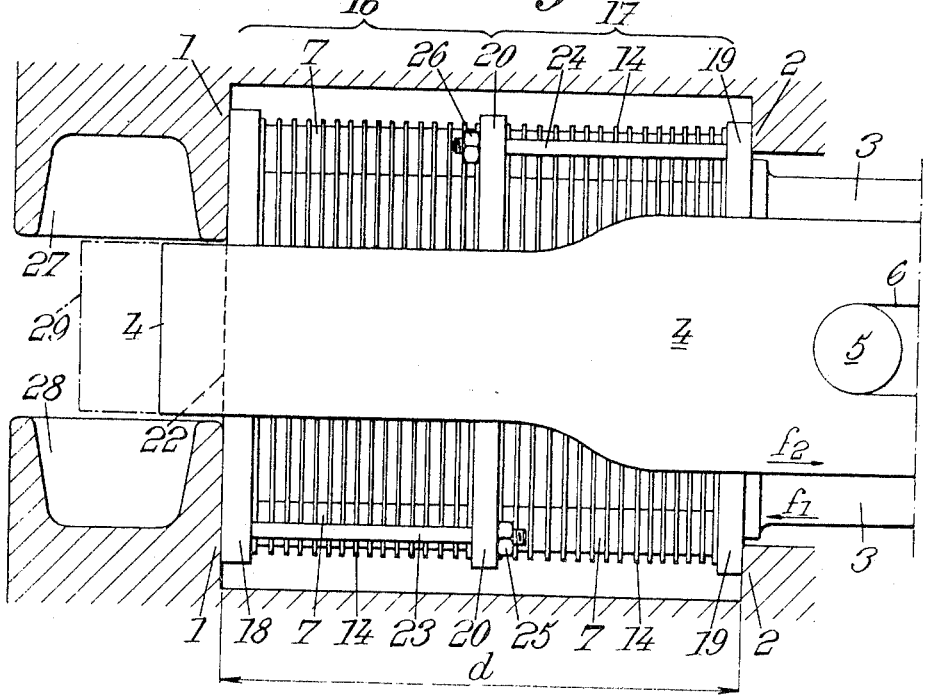

In the mean equilibrium position visible in FIGS. 2 to 4, the two end plates 18, 19 bear against the fixed surfaces 1 and 2 of the casing, whereas the intermediate plate 20 bears against shoulders 21 of the shackle 4. Furthermore, the left-hand plate 18 bears against the end 22 of the shackle 4, whereas the right hand plate 19 bears against the piston 3.

The two blocks thus constituted are each completed by at least two rods perpendicular to the planes of the slabs of the assembly, each pair 23, 24 of rods associated with one of the two blocks 16, 17 being disposed in a different diagonal plane, so that they do not interfere with each other. The existence of the cant corners 15 permits the passage of the rods, thereby reducing the size.

These rods, in combination with the nuts which are described below, serve not only to ensure the guidance of the elastic slabs 7 during the operation of the coupling system, but also to ensure an adjustable prestressing and to facilitate the introduction of the two blocks into the space which is provided for them, in the casing during assembly.

For example, the rods in question are welded or screwed onto the end plates 18, 19 whereas their opposite ends pass freely through the intermediate plate 20, but are threaded in order to receive tightening nuts 25, 26 of adjustable position.

The coupling operates as follows.

First of all, with regard to the insertion of the assembly of the two blocks in the space intended to receive this assembly, it will be appreciated that this insertion is particularly facilitated by the nuts 25, 26, which permit the assembly of these two blocks to be reduced to dimensions less than the distance $d$ separating the bearing surfaces 1 and 2.

In this form, it is thus sufficient to slide the assembly inside the shackle 4 assumed to be already in place, after which the nuts are unscrewed until the unit thus formed comes, by the relaxation of the rubber, to bear against the opposite surfaces 1 and 2, the intermediate plate 20 thus assuming automatically a mean position of equilibrium, simply in contact with the shoulders 21.

It should be noted that at this moment the assembly has a predetermined precompression, which is favorable to the operation of the coupling system.

The operation of the assembly after assembling will now be considered.

Figure 8:
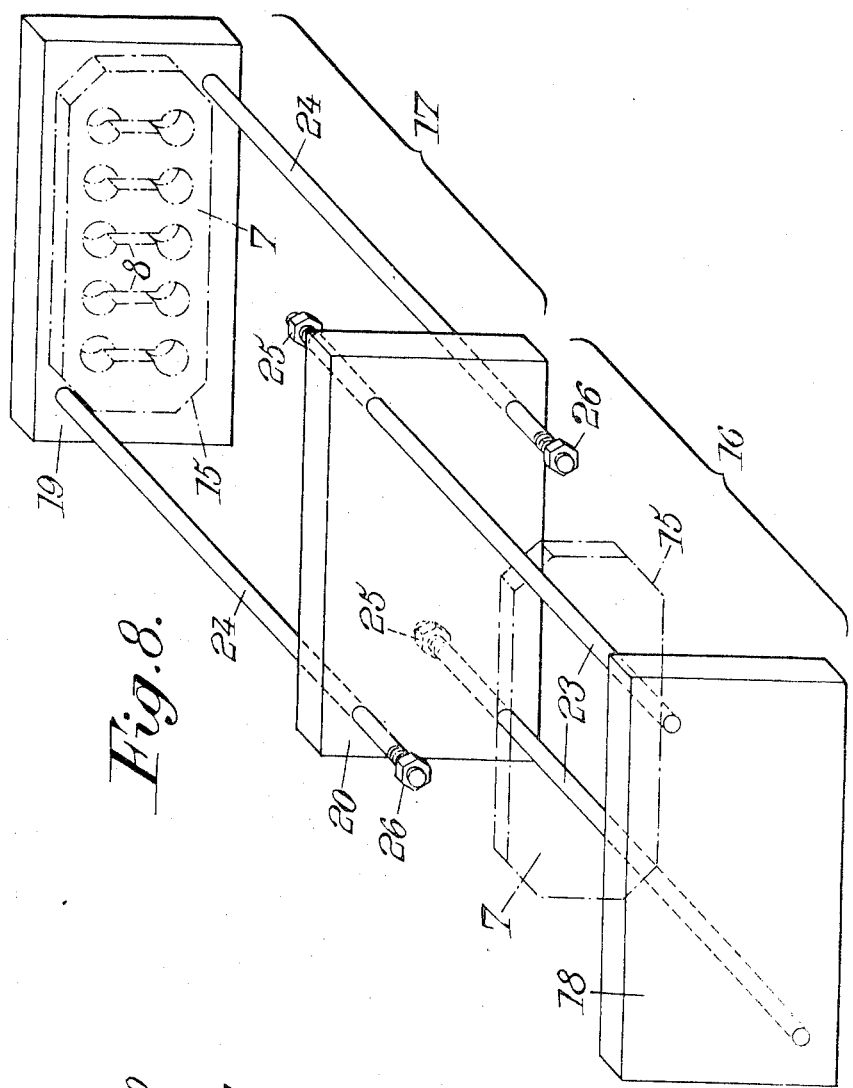
FIG. 8 shows, in schematic perspective the overall device, with certain elements removed in order to bring out illustrate the principle of assembly.

In thrust (or buffing) through the piston 3 in the direction of the arrow $f_1$, all the elements of the unit are compressed against the plate 18 which itself bears against the fixed parts 1; the shackle 4, which is free, recoils and passes between the fixed pieces of the casing such as 27, 28, the end of the shackle reaching, for example, the position 29. FIG. 8 in which, for greater clarity, the shackle has been eliminated and only a single rubber slab of the groups 16 and 17 (FIG. 2) has been shown in dot-dash lines, shown the elastic unit in thrust or buffing position. The four rods 23, 24 slide in the holes of the plate 20 without by extending at all beyond the longitudinal limits of the precompressed unit.

In traction, which is exerted by the shackle 4 in the direction of the arrow $f_2$, the intermediate plate 20 is engaged by the shoulders 21 of the shackle 4 (so that the group of elements 16 does not come into play, but undergoes displacement as a unit, thus preserving its initial precompression), and only the elements of the group 17 are compressed by bearing against the plate 20, which itself bears, against the fixed parts 2 of the casing. Then only the rods 24 slide in the plate 20 and remain within the lengthwise limits of the precompressed unit Under these conditions, it is seen that in the direction of buffing, the elasticity of the complete unit is used, and in the direction of traction, only the elasticity of the group 17 is used. If the groups 16 and 17 are identical, as in the case shown in the drawings, the coupling is thus twice as flexible in the direction of buffing than in the direction of traction.

A coupling system constructed in accordance with this invention presents numerous advantages, in particular:

the advantage of ensuring great facility of assembly and the advantage of permitting excellent performance with good elasticity curves (conforming closely to operational requirements) while being of relatively small size.

What I claim is:

1. In a vehicle coupling system comprising
a support adapted to be fixed to a vehicle chassis,
a plurality of slabs of elastomeric material alternated with rigid plates and mounted in said support, said slabs having major faces shaped in the general form of a rectangle and being juxtaposed in the direction perpendicular to said faces,
a shackle cooperating with said slabs for transmitting traction force to said support, in said direction and in one sense, through at least a first group of said slabs, with respect to which first group of slabs said force is a compressive force,
and a buffer member cooperating with said slabs for transmitting buffing force to said support, in said direction but opposite to said one sense through both said first group of slabs, and the remaining group of slabs,
the improvement wherein said slabs are provided with a plurality of slots parallel to the small sides of said rectangle, said slots having sides which are urged together tending to close the slot when the slab is subjected to said compressive force, each said slot terminating, at each end, in a rounded hole of width greater than the width of the slot so as to present a dumbbell shape, said slab having relatively high elasticity under low-compressive forces when said slots remain partially open, and relatively low elasticity under high-compressive forces when said slots are closed, said slots being of such number and size that their facing sides come into contact at the end of the linear portion of the predetermined force/stroke relationship curve of the system.

2. The coupling system of claim 1, further comprising two end plates disposed respectively at the two extreme ends of the juxtaposed slabs, and an intermediate plate between said two groups, and two pairs of rods respectively for the two groups of slabs, the rods of one pair being fixed solidly to one end plate and passing through the intermediate plate, and the rods of the other pair being fixed solidly to the other end plate and passing freely through the intermediate plate, and abutment means adjustably disposed on the free ends of the rods of each pair for subjecting the slabs of the corresponding group to precompression.

3. The coupling system of claim 2, wherein each pair of rods is disposed in a different plane passing through the diagonals of the rectangular slabs.

4. The coupling system of claim 3, wherein the slabs have cant corners which leave spaces for the rods, the rods of one pair passing by the slabs adjacent to the cant corners of the corresponding diagonal.

5 The coupling system of claim 4, wherein the slabs are provided with corresponding ribs and grooves, in the form of a cross, by which the slabs fit together.

6. The coupling system of claim 5, wherein said shackle comprises shoulder means for pulling, during traction, both the rear end plate and the intermediate plate, so that only the slabs of the group disposed in front of said intermediate plate transmit the traction force to said support, whereas said buffing member comprises means for pushing, during buffing, on only the front end plate, so that the slabs of both groups transmit the buffing force.

* * * * *